2,955,117
Patented Oct. 4, 1960

2,955,117
MANUFACTURE OF HALOGENATED ORGANIC COMPOUNDS

Bengt Tore Lennart Sjöstrand, Kristinehöjdsgatan 8, Goteborg, Sweden

No Drawing. Filed Oct. 22, 1957, Ser. No. 691,539

Claims priority, application Sweden Nov. 2, 1956

5 Claims. (Cl. 260—396)

This invention relates to the manufacture of halogenated organic compounds by a multi-stage process.

Halogenation reactions are usually carried out catalytically. In a multi-stage process, however, often the reaction of the later stages are catalysed. In order to accomplish this the catalyst may be added in one of the later stages or the catalyst may be formed or activated in a later stage of the process.

It is often necessary to assure that no active catalyst is present in the initial stage of a process cycle, since otherwise undesirable reactions are likely to occur.

Carrying out the process in this way, however, difficulties arise when after the isolation of the product the mother liquor is used again as the reaction medium in a subsequent cycle in order to as completely as possible recover the rest of the product remaining dissolved therein. This is because the catalyst is thereby carried over into the first stage of the subsequent cycle where it is very apt to cause the undesirable reactions mentioned above. Consequently it has proved impossible to re-use the reaction medium and by this means recover the whole amount of product formed.

Moreover the reaction medium used as reaction medium can only be regained incompletely and at high costs, because it has been necessary for this purpose to resort to distillation.

According to the present invention therefore the halogenation process is carried out in such a way that the reaction medium can be re-used several times. Hence the yield is increased and the loss of solvent is decreased and also the distillation of the solvent is dispensed with.

The invention involves operation under such conditions that the catalyst which is necessary in the later stages of the process is rendered inactive before the reaction medium is introduced into the first stage of the subsequent cycle. It is thus possible to recirculate the reaction medium from one cycle to another avoiding undesired reactions that would be caused by an active catalyst in the first stage of each cycle. As a matter of course it is necessary in the subsequent cycles either to add the catalyst into the later stages of each cycle or to provide for reformation of the catalyst after the reaction of the first stage of each cycle has been terminated.

The reason why in the initial stage no catalyst is required, whereas in the later stages catalysts are indispensable may be that in the first stage an addition reaction occurs, whereby halogen is added to the compound to be halogenated.

This reaction is carried out without the catalyst. In the second stage the elements of hydrogen halide are split out under the influence of the catalyst and after that, in the third stage a catalytic substitution occurs. These reactions may be conveniently illustrated by the three following equations:

(1)  —CH=CH—+Cl$_2$=—CHCl—CHCl—
(2)  —CHCl—CHCl—=—CH=CCl—+HCl
(3)  —CH=CCl—+Cl$_2$=—CCl=CCl—+HCl

As pointed out above no catalyst is needed for the first reaction. On the contrary a catalyst would give rise to undesirable reactions in the first stage of each cycle, whereas in the subsequent stages of each cycle a catalyst is required.

As catalysts, I prefer to use halides, e.g. metal halides and preferably halides of multivalent metals, as FeCl$_3$ and AlCl$_3$.

These halides, however, are often catalytically active only when anhydrous. When according to the present invention water is added to the reaction medium before this is re-used in the first stage of the subsequent cycle the catalyst dissolved in the reaction medium is converted into the hydrate form (e.g. FeCl$_3 \cdot$6H$_2$O) and thus made devoid of any catalytic activity. The catalyst thus inactivated will not be able to give rise to undesirable reactions in the first stage of a successive reaction cycle.

A similar result can be obtained by converting the catalyst into another complex form.

If the reaction medium after having been re-used several times should become too concentrated in regard to accumulated inactivated catalyst, this may be extracted by a solvent for the inactivated catalyst which solvent is immiscible with the reaction medium. The reaction medium is thus regained in a suitable condition for re-use.

The inactivated catalyst being metal halide hydrate the reaction medium may be extracted with water. The metal halide hydrate is thereby dissolved into the water layer that may be readily removed. The reaction medium is then treated with a drying agent, e.g. CaCl$_2$ to remove water and the reaction medium treated in this way may be used again in the first stage of a new cycle.

My invention is of special interest for the manufacture of 2,3-di-chloro-1,4-naphthoquinone by chlorination of 1,4-naphthoquinone.

It is advantageous to carry out the halogenation process using a reaction medium consisting of nitrobenzene and a catalyst consisting of a metal halide, preferably FeCl$_3$.

This process involves the following stages:

(1) Formation of naphthoquinonedichloride (II) by an addition reaction whereby chlorine is added in the 2- and 3-position of the 1,4-naphthoquinone (I).

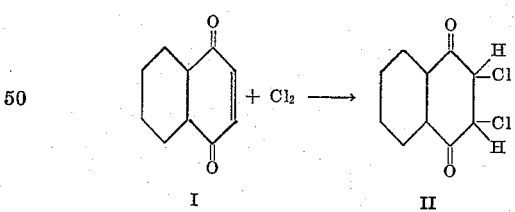

(2) Formation of 2-chloro-1,4-naphthoquinone (III) by dehydrochlorination of II, viz. splitting out the elements of hydrogen chloride from adjacent carbon atoms in the 2- and 3-position.

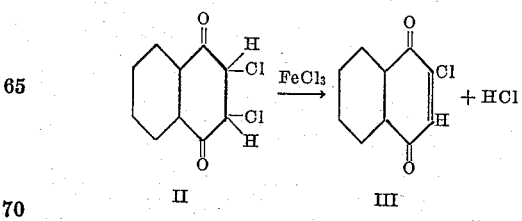

(3) Conversion of III into the 2,3-dichloro-1,4-naphthoquinone (IV) by a substitution reaction whereby chlorine is substituted for the hydrogen in the 3-position.

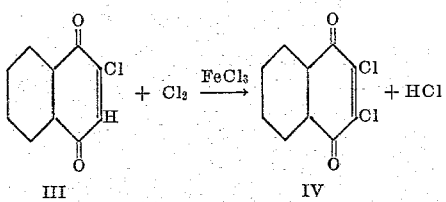

As mentioned previously no catalyst is required in the first stage, whereas in the two later stages a catalyst is indispensable.

If a catalyst, e.g. FeCl₃ should be present in the first stage of the process it would give rise to undesirable reactions, probably polymerisation reactions, which would result in conversion of the 1,4-naphthoquinone into a black, difficultly soluble substance.

On completion of the first part of the reaction, viz. the addition reaction of the first stage, the catalyst is added to the reaction medium or the catalyst is formed therein and the reaction is carried on by further addition of chlorine. Thereby the reactions of stages 2 and 3 occur simultaneously.

In industrial practice it is often convenient to add iron powder already at the beginning of the process, this being possible since the reaction in the first stage is carried out under such conditions that substantially no interaction between the iron powder and the chlorine occurs. Under the reaction conditions of the later stages FeCl₃ is formed and this FeCl₃ functions as a catalyst in the later stages.

On completion of the reaction of the later stages the product (2,3-dichloro-1,4-naphthoquinone) is obtained as yellow crystals which may be separated from the mother liquor by filtration. The product, however, is somewhat soluble in the mother liquor (nitrobenzene); and since the process is carried out in a relatively great amount of reaction medium (nitrobenzene) it will contain dissolved therein rather a great amount of the product. It is therefore advantageous to recirculate the reaction medium, i.e. to re-use it several times. As mentioned above it is, however, necessary to eliminate the catalyst before the reaction medium is used in the first stage of the subsequent cycle. According to prior art it has been necessary to separate the mother liquor from the catalyst by distillation but this gives rise to high costs and substantial losses of product, since it would be impossible to isolate the remaining product from the distillation residue. Moreover, the apparatus used is exposed to a severe corrosive attack during distillation. It is difficult to extract the waterfree iron III chloride which is dissolved in the nitrobenzene e.g. with water, since quite stable emulsions are formed during this extraction, and further the extraction has to be repeated several times owing to the partition equilibrium of the FeCl₃ between the nitrobenzene and the water phase.

According to an embodiment of the present invention, therefore, water is added in the amount required to form the hexaquo complex with the FeCl₃ contained in the reaction medium. This hexaquo complex (FeCl₃·6H₂O) is also soluble in the nitrobenzene. To accelerate the formation of the hexaquo complex it is sometimes advantageous to add an excess of water. The reaction medium may conveniently be treated with an insoluble drying agent, e.g. waterfree CaCl₂ or waterfree Na₂SO₄, to remove the last trace of water.

The drying agent should be added in small amounts and can readily be removed leaving the reaction medium in a suitable condition for reuse. FeCl₃·6H₂O has no undesirable catalytic action under the conditions maintained during the first stage. Moreover it is very stable and decomposes only at very high temperatures. The reaction medium treated in this way may therefore with no risk of undesirable reactions be used in the first stage of the subsequent cycle. It is, however, also possible to add a less amount of water than the stoichiometric amount to form said hexaquo complex, preferably at least the half of this amount. It is thus evident that an expensive operation (distillation) is dispensed with; moreover great losses of nitrobenzene are avoided and considerable amounts of product which are dissolved in the reaction medium are regained in the subsequent cycles.

Besides being advantageous from the technological point of view the invention thus makes it possible to increase the yield.

Although the mechanism of the undesirable reactions in the first stage is not known definitely no doubt they are of great complexity, and it was therefore not obvious that the aquo complex would not have any accelerating action upon the undesirable reactions in the first stage; on the contrary this fact clearly confirmed by the results of the present invention was very surprising.

It may also be pointed out that according to the present invention it is especially advantageous to manufacture 2,3-dichloro-1,4-naphthoquinone in using 1,4-naphthoquinone as starting material.

While it is not desired that the invention be restricted to halogenation of 1,4-naphthoquinone it may be stated that thereby the first stage of each cycle should not be carried out at a temperature above 45° C. preferably in the range of 15–35° C. and the subsequent stage or stages should not be carried out at a temperature below 50° C., preferably it is carried out at a temperature of 55° C. or 65° C. or above.

In order that the invention may be more fully understood the following examples are given by way of illustration only:

*Example 1*

4 kgs. of 1,4-naphthoquinone is slurried with 16 kgs. of nitrobenzene in a lead-lined reaction vessel which is provided with stirring and heating means. 45 grams of iron powder and thereafter chlorine are added. The process may be started at 15–20° C. The temperature is not raised above 40° C. before the reaction of the first stage is terminated, i.e. after about 4 hours. After that the temperature is increased above 50° C. and the reaction is terminated at a temperature which finally has increased to 85–95° C. The reaction mixture is then cooled and the precipitated product is separated from the mother liquor by filtration. The waterfree FeCl₃ dissolved in the mother liquor is now converted into the hexaquo complex by addition of 100 g. of water. The yield of precipitated dichloro-naphthoquinone amounts to 81% of the theoretical value, calculated on the amount of pure 1,4-naphthoquinone used.

The reaction medium treated with water as described above is filled with fresh nitrobenzene in an amount corresponding to the losses during the reaction and filtration and is thereafter used again in a second cycle carried out exactly as the first cycle. This cycle yielded 92% dichloronaphthoquinone. The second cycle occurred without any undesirable reactions in the same favourable way as the first cycle.

In this manner the process was repeated in 10 cycles. The average yield of all cycles amounted to 91%.

*Example 2*

For the purpose of comparison the process of Example 1 was repeated but no water treatment was interposed between the cycles. In this case the mother liquor darkened already during the second cycle and the dichloronaphthoquinone formed was discoloured and impure. In the third cycle the mother liquor as well as the product formed was so impure that neither of them could be used any more.

*Example 3*

The process of Example 1 was repeated, replacing the water treatment between the cycles by distillation of the mother liquor to liberate it from the catalyst.

The yield in the first cycle was 81% and the average of 5 cycles was only 80%.

In order to facilitate still more cycles with the same reaction medium it is desirable from time to time to reduce the proportion of accumulated aquo complex in the reaction medium.

This can be readily accomplished by increasing the magnitude of water addition at the water treatment between the cycles. The excess of water thus added forms a concentrated solution of the $FeCl_3 \cdot 6H_2O$ as a lower layer, which is tapped off.

Any water remaining in the reaction medium may be removed by adding a small amount of a drying agent as described above.

Example 4

The process of Example 1 was repeated. After isolation of the product of the 6th cycle a larger quantity of water was added to the reaction medium. Hereby a concentrated solution of $FeCl_3 \cdot 6H_2O$ was formed as a lower layer which was tapped off. The reaction medium was then treated with dry $CaCl_2$ and used again in 4 cycles. The average yield of the 10 cycles was 92%.

Although the invention has been described by processes involving chlorination in three stages whereby these stages have been repeated in a series of subsequent cycles, the invention may of course be adapted to such processes involving several stages wherein the chlorination itself occurs in one stage only but nevertheless the catalyst would be undesired in another chemical or physical stage in the cycle. In the following claims therefore the word "stage" will also denote such chemical or physical stages.

What I claim is:

1. A process according to claim 5 in which the first stage of each cycle is carried out at a temperature between 15° C. and 35° C.

2. A process according to claim 5 in which nitrobenzene is used as reaction medium.

3. In a process according to claim 5, in which nitrobenzene is used as reaction medium; inactivated catalyst is removed from the reaction medium after the reaction medium has been used in a number of cycles, and 2,3-dichloro-1,4-naphthoquinone formed in the last cycle has been separated therefrom, whereupon the mother liquor freed from inactivated catalyst is dried and used again as the reaction medium in a number of cycles, and new catalyst is added between the first and second stage in each cycle.

4. A process as claimed in claim 5, in which $FeCl_3$ catalyst is formed in the reaction medium between said two stages.

5. In a process for the manufacture of 2,3-dichloro-1,4-naphthoquinone by chlorination of 1,4-naphthoquinone, comprising chlorination with molecular chlorine in successive cycles and with the re-use of the mother liquor of the preceding cycle in the following cycle after addition of new starting material; each cycle comprising two stages; a first stage consisting in the non-catalytical formation of 1,4-naphthoquinone dichloride by addition of chlorine at the 2 and 3 positions of the 1,4-naphthoquinone at a temperature below 45° C., a second stage being carried out in the presence of $FeCl_3$ as catalyst at a temperature over 50° C. which catalyst is absent until the termination of the first stage and consisting in the dehydrochlorination of the 1,4-naphthoquinone dichloride to 2-chloro-1,4-naphthoquinone and subsequent substitution of the hydrogen atom in 3-position of the 2-chloro-1,4-naphthoquinone by a chlorine atom, whereupon the 2,3-dichloro-1,4-naphthoquinone crystals formed are separated from the mother liquor, the improvement which comprises the step of inactivating the catalyst by adding water to the mother liquor in a quantity amounting to at least half of the quantity necessary for converting $FeCl_3$ into $FeCl_3 \cdot 6H_2O$ after completion of the second stage and using the mother liquor thus treated in subsequent cycles carried out in the same way as the first cycle.

References Cited in the file of this patent

UNITED STATES PATENTS

| | | |
|---|---|---|
| 1,969,686 | Britton et al. | Aug. 7, 1934 |
| 2,722,537 | Fox | Nov. 1, 1955 |
| 2,750,427 | Gaertner | June 12, 1956 |
| 2,886,577 | Fan | May 12, 1959 |

FOREIGN PATENTS

| | | |
|---|---|---|
| 646,639 | Germany | July 12, 1937 |
| 589,501 | Great Britain | June 23, 1947 |

OTHER REFERENCES

Bertheim: Berichte der Deut. Chem. Gesell., vol. 34, p. 1554 (1901).

Brass: Berichte Deutsche Chemische Gesellschaft, vol. 55, p. 2554 (1922).

Elsevier's Encyclopedia of Organic Chemistry, vol. 12 B, series 3, pp. 2905–2906, Elsevier Publishing Company (1952), Amsterdam.